July 6, 1948.　　　M. M. HENNESSY ET AL　　　2,444,566
INTERMITTENTLY ROTATABLE ELECTRIC MOTOR
Filed Feb. 7, 1947　　　　　　　　　　　　2 Sheets-Sheet 1

INVENTORS
M. M. Hennessy
BY H. J. Lawrence
Lieber & Lieber
ATTORNEYS.

July 6, 1948.　　M. M. HENNESSY ET AL　　2,444,566
INTERMITTENTLY ROTATABLE ELECTRIC MOTOR
Filed Feb. 7, 1947　　2 Sheets-Sheet 2
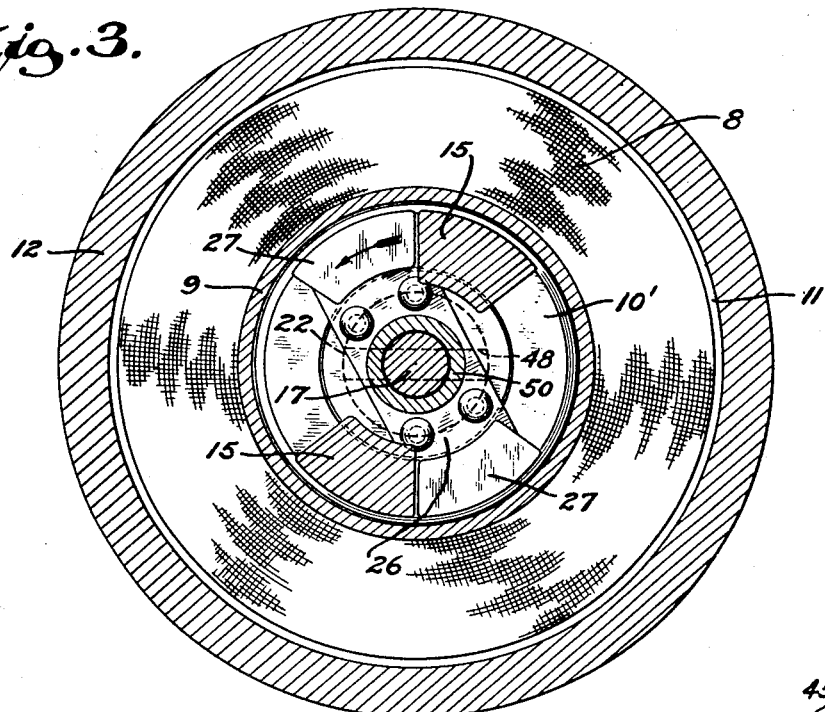
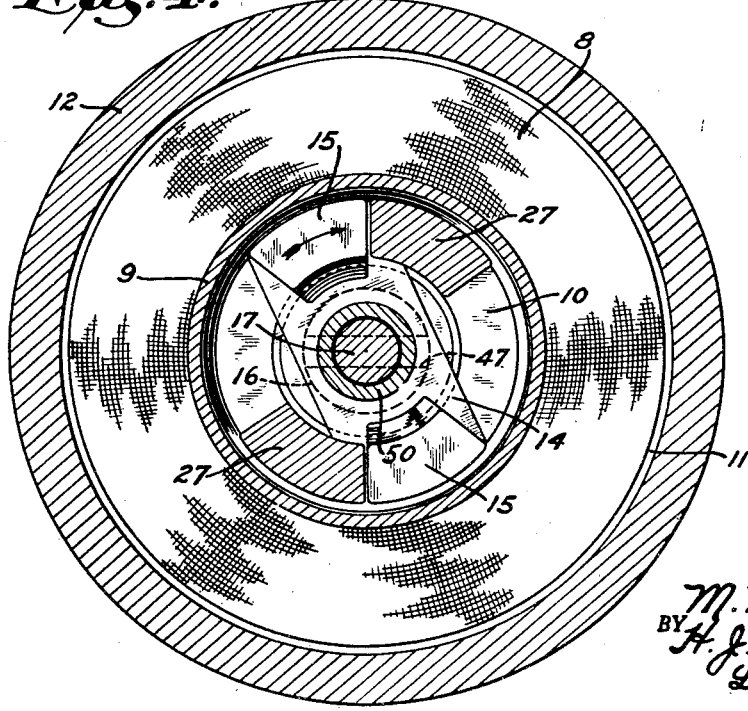
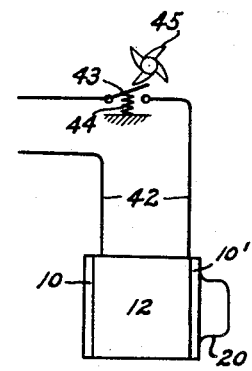
INVENTORS
M. M. Hennessy
H. J. Lawrence
BY Lieber & Lieber
ATTORNEYS.

Patented July 6, 1948

2,444,566

UNITED STATES PATENT OFFICE 2,444,566

INTERMITTENTLY ROTATABLE ELECTRIC MOTOR

Mark M. Hennessy and Harold J. Lawrence, Milwaukee, Wis., assignors to Durant Manufacturing Co., Milwaukee, Wis., a corporation of Wisconsin Application February 7, 1947, Serial No. 727,010

16 Claims. (Cl. 172—36)

Our invention relates generally to improvements in the art of electric propulsion, and relates more specifically to improvements in the construction and operation of intermittently rotatable electric motors adapted for various uses such as the step-by-step rotation of the actuating shafts of counting and registering devices, operation of the switch wafers of stepping relays, opening or closing of valves, and diverse military, scientific, and other commercial purposes.

Many different types of "so-called" rotary solenoids or step-by-step electric motors have heretofore been proposed and utilized for various purposes, and in some of these prior devices an electric coil is adapted to be repeatedly energized so as to create torque impulses of sufficient intensity acting upon an oscillatory armature or shaft, to angularly displace the solenoid actuated member a fraction of a revolution during each successive coil energizing period, the displaced member however being reversely rotated and returned to its initial or starting position during each coil de-energized or inactive period. In others of the previous assemblages of this type, the oscillatory shaft member is also movable axially in order to transmit the step-by-step motion through ratchet mechanism to the driven element, and these oscillatory and reciprocating movements of the solenoid armature are highly objectionable since they tend to cause vibration and to retard high speed actuation of the motors.

It is therefore an object of our present invention to provide an improved intermittently rotatable electric motor embodying a solenoid coil and armature, and wherein the latter is operable by repeated energization of the coil so as to produce step-by-step angular displacement of the actuated member in the same direction and without causing axial displacement thereof.

Another object of this invention is to provide an improved step-by-step electrically actuated motion producing mechanism which is simple, compact and durable in construction, and which is also highly efficient in operation and flexible in its adaptations for diverse uses.

A further important object of the invention is to provide an improved electric impulse motor which is adapted to accurately transmit successive angular displacements of equal magnitude to a driven shaft or other element for actuating various kinds of devices by fractional rotations or rotary steps.

Still another object of our invention is to provide a simplified solenoid motor embodying relatively few sturdy parts which may be readily manufactured and assembled or dismantled, and which are also easily accessible for inspection.

Another or additional object of the present invention is to provide a small but powerful electrically actuated intermittent or step-by-step motor which is safely operable either with alternating or direct current, and which may be manufactured in various sizes for diverse uses at moderate cost.

These and other specific objects and advantages of the invention will be apparent from the following detailed description.

A clear conception of the features constituting our present improvement, and of the mode of constructing and of operating a typical intermittently rotatable electric motor embodying the invention, may be had by referring to the drawings accompanying and forming a part of this specification wherein like reference characters designate the same or similar parts in the various views.

Fig. 3 is another transverse section through the same motor viewed in the direction of the arrows and taken along the line 3—3 of Fig. 1, but showing the relative position of the parts when the solenoid is de-energized;

Fig. 4 is still another transverse section through the motor viewed in the opposite direction as indicated by the arrows and taken along the line 4—4 of Fig. 1, also showing the relative position of the parts when in inactive position; and Fig. 5 is a wiring diagram showing a typical assemblage for intermittently energizing the solenoid.

Figure 1:
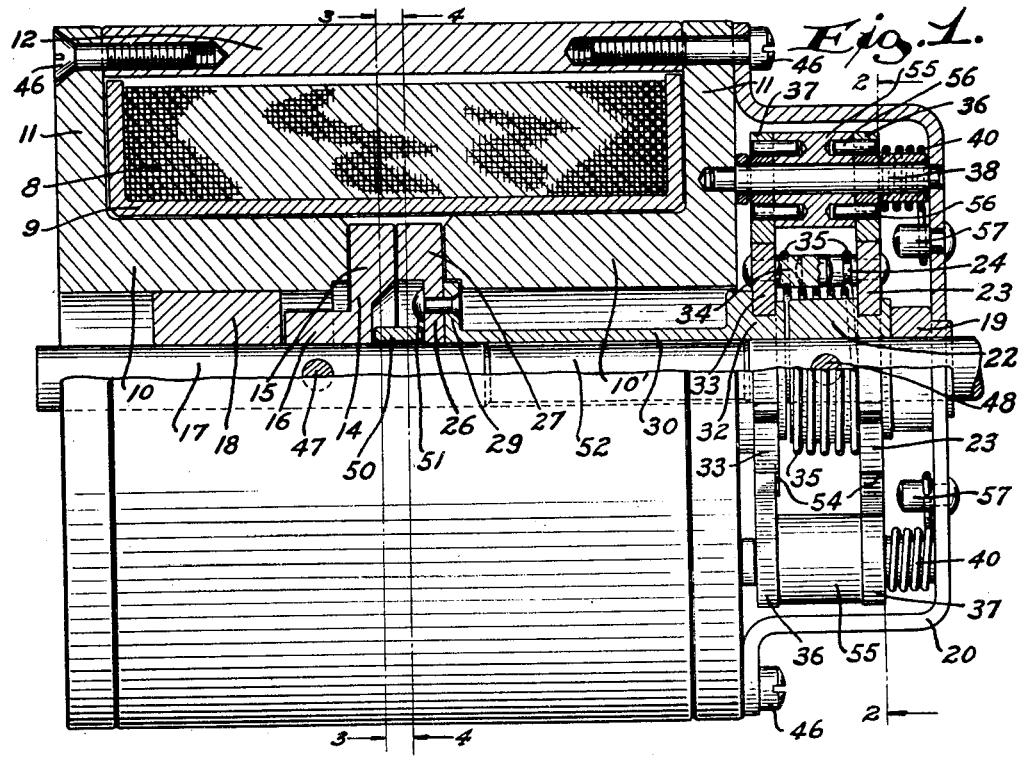
Fig. 1 is a central longitudinal section through the typical step-by-step rotary solenoid actuated motor, showing the relative position of the parts when the solenoid is energized.

While the invention has been shown and described herein as being advantageously applicable to relatively small and compact impulse motors especially adapted to actuate counting and registering devices by steps each equal to one-tenth of a revolution, it is not our desire or intention to thereby unnecessarily limit or restrict the utility of the improved features which may obviously be more generally applied.

Referring to the drawing, the typical intermittently rotatable electric motor shown therein, comprises in general an annular solenoid coil 8 wound upon a suitable spool 9 which snugly embraces a pair of fixed laterally spaced frames 10, 10' having alined central bores and being provided with integral outer end flanges 11 rigidly united by an annular shell 12 surrounding and enclosing the coil 8; an armature 14 having diametrically opposite poles 15 intermittently revolvable in the same direction within the coil 8 near the inner end of one of the frames 10, 10' and being provided with a hub 16 secured to a central main shaft 17 journalled for rotation in bearings 18, 19 carried respectively by the frame 10 and by a bridge member 20 secured to the other frame 10'; a ratchet wheel hub 22 firmly secured to the shaft 17 near the outer bearing 19 and having a ratchet wheel 23 attached thereto and provided with a pin 24 projecting laterally therefrom toward the frame 10'; a pole piece 26 having diametrically opposite poles 27 also intermittently revolvable in the same direction as the armature poles 15, within the coil 8 near the inner end of the other frame 10' and being secured to the adjacent flanged end 29 of a sleeve 30 rotatably embracing the shaft 17; another ratchet wheel hub 32 formed integral with the outer extremity of the sleeve 30 near the hub 22 and having a second ratchet wheel 33 rigidly attached thereto and provided with a pin 34 projecting laterally therefrom away from the frame 10'; a strong coil spring 35 surrounding the ratchet wheel hub 22 and having its opposite ends attached to the pins 24, 34 respectively; and two similar sets of diametrically opposite pawls 36, 37 swingably suspended from pivot shafts 38 secured to the frame 10' and bridge member 20, and being constantly urged toward ratchet wheel holding position by means of other coil springs 40.

The terminals of the solenoid coil 8 may be connected to an electric current supply line 42 having any desired type of mechanism therein for intermittently or repeatedly making and breaking the circuit; and as shown diagrammatically in Fig. 5, this mechanism comprises a switch 43 adapted to be opened by a spring 44 and to be closed by a rotary cam wheel 45. Whenever the solenoid is energized by closing of the switch 43, it creates lines of force which magnetize the poles 15, 27 of the armature 14 and pole piece 26 respectively, and this repeated magnetization is the prime factor which causes the poles 27 to attract the adjacent poles 15 so as to produce the step-by-step rotation of the main shaft 17 without at any time permitting reverse rotation of this shaft, as will be hereafter more fully described. The annular inner portions of the frames 10, 10' are slip fitted within the central bore of the spool 9 and are retained therein in properly spaced relation, by means of screws 46 which coact with the frame flanges 11 and with the annular coil enclosing shell 12; and the screws 46 which hold the frame 10' in place, also serve to attach the bridge piece 20 to this frame.

The armature 14 is firmly but detachably secured to the shaft 17 by means of a pin 47 which pierces the shaft and the armature hub 16 as shown in Figs. 1 and 4; and the ratchet wheel hub 22 is likewise attached to the shaft 17 by a similar pin 48 as illustrated in Figs. 1 and 3. The armature 14 and the pole piece 26 are maintained in properly separated or spaced condition by a collar 50 which embraces the shaft 17 between these elements, and the pole piece 26 may be firmly secured to the end flange 29 of the sleeve 30 by means of rivets 51 or the like. The shaft bearing 18 is snugly confined within the bore of the frame 10, while the other bearing 19 is firmly secured to the relatively strong bridge piece 20, and either end of the intermittently rotatable main shaft 17 may be utilized as a power take-off. Since the elongated sleeve 30 is rotatable about the shaft 17, it may be desirable to reduce the friction between these elements by reducing the shaft diameter within the medial portion of the sleeve bore as depicted in Fig. 1, and this reduced shaft portion 52 may be utilized for the confinement of suitable lubricant.

The two ratchet wheels 23, 33 are of similar construction and are mounted coaxially of the shaft 17 upon the hubs 22, 32 associated with the shaft 17 and sleeve 30 respectively, and each of the ratchet wheels 23, 33 is provided with a series of equally spaced peripheral notches 54 with which the pawls 36, 37 are cooperable so as to positively prevent possible reverse rotation of the shaft 17. The equal spacing of these ratchet wheel notches, determines the angle through which the shaft 17 is rotated during each of the successive active periods or energizations of the solenoid coil 8, and as shown, there are ten of these notches 54 on each ratchet wheel 23, 33 so that each magnetic impulse will rotate the shaft one-tenth of a revolution or thirty-six degrees. As previously indicated, the ratchet wheel 23 carries a pin 24 while the ratchet wheel 33 carries a similar pin 34, these pins 24, 34 being revolvable along a common circular path and being interconnected by a relatively strong helical spring 35 which surrounds the hub 22.

Figure 2:
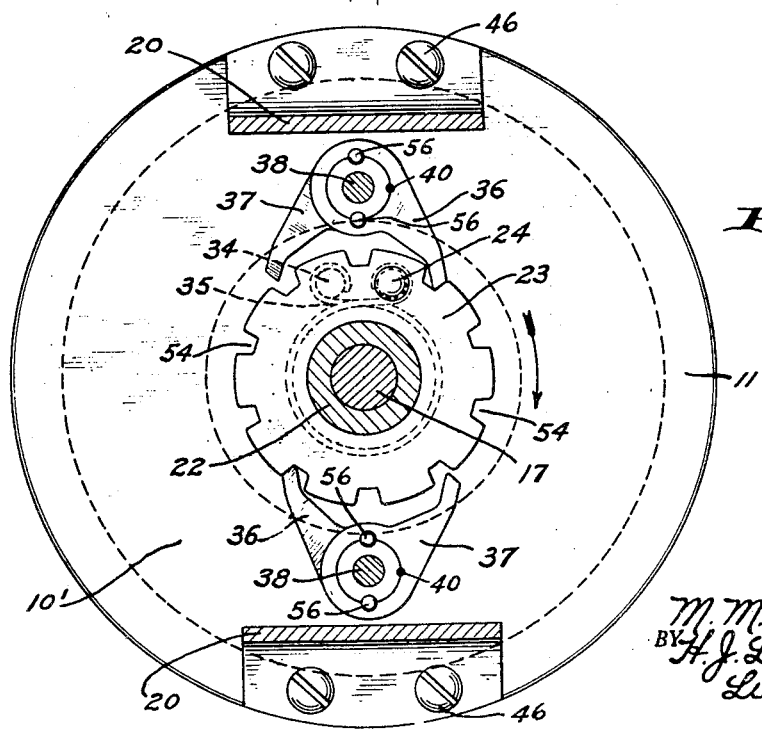
Fig. 2 is a transverse section through the motor of Fig. 1, taken along the line 2—2.

The pawls 36 of the two diametrically opposite sets are simultaneously cooperable with the ratchet wheels 23, 33 respectively to prevent reverse rotation of the shaft 17 and sleeve 30, during periods when the other pawls 37 are inactive or out of engagement with the notches 54 of the adjacent wheels; and the pawls 37 of the two opposed sets are likewise simultaneously cooperable with the two ratchet wheels 23, 33 to prevent reverse rotation of the shaft and sleeve whenever the pawls 36 are inactive. The pawls 36, 37 of each set are firmly secured to each other by means of bushings 55 and connecting pins 56; and the coil springs 40 which constantly tend to return the pawls 36 to active position as illustrated in Fig. 2, each have one end secured to the adjacent set of pawls 36, 37 while the opposite spring end is fastened to a fixed pin 57 secured to the bridge piece 20, see Figs. 1 and 2.

When the improved motor has been properly constructed and assembled as above described and as shown in the drawings, it may be utilized for diverse purposes to intermittently rotate the main shaft 17 in the direction indicated by the arrows, by successive steps each equal to one-tenth of a revolution, by merely revolving the cam wheel 45 so as to effect successive closing and opening of the switch 43. Whenever the switch 43 is closed, the coil 8 will be energized, thereby causing the poles 15, 27 of the armature 14 and pole piece 26 to become magnetized so as to attract each other. Since the pole piece 26 is positively prevented from moving counter-clockwise as viewed in Fig. 2, by the lower pawl 36 coacting with the ratchet wheel 33, the magnetized armature 14 will revolve so that the poles 15 thereof will be disposed directly adjacent to the poles 27 of the momentarily fixed pole piece 26; and during this advancement of the magnetized armature, the upper pawl 36 will be lifted out of the adjacent notch 54 of the ratchet wheel 23 while the complementary upper pawl 37 will simultaneously be depressed into the adjacent notch 54 of the other ratchet wheel 32.

After the poles 15, 27 have been brought into such direct adjacency, the shaft 17 and the ratchet wheel 23 associated therewith, will have rotated one-tenth of a revolution and will remain in this advanced position until the coil 8 is deenergized by opening of the switch 43. Upon deenergization of the solenoid the coil spring 35 which connects the pins 24, 34 carried by the ratchet wheels 23, 33 respectively and which has been placed under considerable tension by the previous advancement of the armature 14, will become quickly effective to revolve the other previously fixed ratchet wheel 33 and the pole piece 26 connected thereto by the sleeve 30. This movement of the pole piece 26 will also be in a clockwise direction as viewed in Fig. 2, and simultaneously with the demagnetization of the armature 14 and pole piece 26, the upper pawl actuating spring 40 will swing the upper pawls 36, 37 back into their initial position with the upper pawl 36 in holding engagement with the ratchet wheel 23 and the other upper pawl 37 out of engagement with the adjacent ratchet wheel 33. During advancement of the ratchet wheel 33, sleeve 30, and pole piece 26 by the coil spring 35, the lower pawl 36 will be lifted out of the adjacent notch 54 and the complementary lower pawl 37 will be simultaneously depressed into the adjacent notch of the previously advanced ratchet wheel 23, thereby again positively preventing reverse rotation of the shaft 17 and armature 14 whenever the pole piece 26 and sleeve 30 are being rotated.

The switch actuating cam wheel 45 may be operated at any desired speed to repeatedly make and break the electric circuit, and to thereby rapidly repeat the above described cycle of operations. Each cycle of operations causes the energized armature 14 to be advanced one-tenth of a revolution and to assume a position with its poles 15 directly adjacent to or in alinement with the poles 27 of the pole piece 26 while the latter is locked against either forward or reverse movement; and also causes the deenergized armature 14 to be locked against displacement in either direction, while the pole piece 26 is being advanced in the same direction as the previous armature motion, by the coil spring 35. The upper and lower sets of pawls 36, 37 cooperate with the ratchet wheels 23, 33 to positively prevent reverse rotation of these wheels and of the elements associated therewith, thus permitting high speed step-by-step operation of the motor without introducing vibration and delay due to the inertia of oscillating and reciprocating relatively heavy parts. While the pawl sets do oscillate about their pivot pins 38 during normal operation of the assemblage, these pawls 36, 37 are relatively light and are easily displaced by the ratchet wheels 23, 33 and by the return springs 40.

From the foregoing detailed description it will be apparent that our present invention provides an improved intermittently operable or step-by-step solenoid actuated electric motor, wherein the main shaft is constantly rotatable in a predetermined direction by successive steps of selected magnitude, while being positively locked or held against possible reverse rotation. The improved propulsion unit is obviously simple, compact and durable in construction and may be conveniently assembled and dismantled. The armature 14 and pole piece 26 while being normally concealed and protected, are still readily accessible for inspection by merely removing the frame assembly screws 46, and either end of the main shaft 17 may be drivingly connected to the apparatus which is to be driven by the motor. The pawls 36, 37 and ratchet wheels 23, 33 while being amply protected by the sturdy bridge piece or member 20, and also readily accessible for inspection, and a compact assemblage is obtained by positioning all of the pawls and ratchet wheels at the same end of the frame. As previously indicated, the improved solenoid motor may be utilized to drive diverse types of equipment, and the magnitude of the steps may be varied to suit conditions, by merely changing the spacing of the ratchet wheel notches 54. The improved motor functions automatically to produce uniform step-by-step rotation of the shaft member, and may be manufactured at moderate cost while being operable with minimum attention and moderate power consumption.

The important feature of the invention is the provision of a step-by-step or intermittently rotatable electric motor wherein reverse rotation of the armature is positively prevented. The armature 14 is moved forwardly magnetically a distance equal to the magnitude of each step and is locked in such advanced position while the spring 35 subsequently moves the pole piece 26 forwardly a like distance, and the pole piece 26 is likewise locked against displacement in either direction when the armature is moving. The main shaft 17 is also held against axial displacement at all times by the collar 50 and frames 10, 10', and this fact combined with the unitary directional rotation of the motion transmitting elements and with rotary magnetic parts having diametrically opposite poles, insures smooth operation of the motor at all times.

It should be noted that it is not our desire to limit this invention to the exact details of construction or to the precise mode of operation, herein shown and described, because various modifications within the scope of the appended claims may occur to persons skilled in the art; and it is also our intention that specific descriptive terms employed herein be given the broadest possible interpretation consistent with the disclosure.

We claim:

1. A step-by-step rotary electric motor, comprising, a rotary armature, a rotary pole piece cooperable with said armature, means for momentarily magnetizing said armature and pole piece to cause the former to be rotated a definite distance by and relative to the latter, and means for subsequently causing said pole piece to rotate a like distance in the same direction when said armature and pole piece are demagnetized.

2. A step-by-step rotary electric motor, comprising, a rotary armature, a rotary pole piece cooperable with said armature, means for momentarily magnetizing said armature and pole piece to cause the former to be rotated a definite distance by the latter, means for subsequently causing said pole piece to rotate a like distance in the same direction when said armature and pole piece are demagnetized, and means for positively holding said armature and pole piece against rotation whenever the other of said elements is being rotated.

3. A step-by-step rotary electric motor, comprising, a rotary armature, a rotary pole piece disposed coaxial with and adjacent to said armature, a solenoid coil energizable to momentarily magnetize said armature and pole piece and to thereby cause the former to be rotated a definite distance by and relative to the latter, and means for causing said pole piece to rotate a like distance in the same direction whenever said coil is deenergized.

4. A step-by-step rotary electric motor, comprising, a rotary armature, a rotary pole piece disposed coaxial with and adjacent to said armature, a solenoid coil energizable to momentarily magnetize said armature and pole piece and to thereby cause the former to be rotated a definite distance by the latter, means for causing said pole piece to rotate a like distance in the same direction whenever said coil is deenergized, and means for locking said armature and pole pieces against movement whenever the other of said elements is being rotated.

5. A step-by-step rotary electric motor, comprising, a rotary armature, a rotary pole piece disposed coaxial with and adjacent to said armature, a solenoid coil energizable to momentarily magnetize said armature and pole piece and to thereby cause the former to be rotated a definite distance by and relative to the latter, and a coil spring for rotating said pole piece a like distance in the same direction whenever said coil is deenergized to demagnetize said armature and pole piece.

6. A step-by-step rotary electric motor, comprising, a motion transmitting shaft, an armature mounted upon said shaft, a pole piece rotatable about said shaft, a solenoid coil energizable to magnetize said armature and said pole piece and to thereby cause said armature to rotate said shaft a definite distance relative to said pole piece, and means for causing said pole piece to rotate a like distance and in the same direction about said shaft whenever said coil is deenergized.

7. A step-by-step rotary electric motor, comprising, a motion transmitting shaft, an armature mounted upon said shaft, a pole piece rotatable about said shaft, a solenoid coil energizable to magnetize said armature and said pole piece and to thereby cause said armature to rotate said shaft a definite distance relative to said pole piece, means for causing said pole piece to rotate a like distance and in the same direction about said shaft whenever said coil is deenergized, and pawl and ratchet mechanism for positively preventing reverse rotation of said armature and pole piece.

8. A step-by-step rotary electric motor, comprising, a motion transmitting shaft, an armature mounted upon said shaft, a pole piece rotatable about said shaft, a solenoid coil energizable to magnetize said armature and said pole piece and to thereby cause said armature to rotate said shaft a definite distance relative to said pole piece, means for causing said pole piece to rotate a like distance and in the same direction about said shaft whenever said coil is deenergized, and pawl and ratchet mechanism for locking said armature and pole piece against movement whenever the other of said elements is being rotated.

9. A step-by-step rotary electric motor, comprising, a rotary armature, a rotary pole piece disposed coaxial with and adjacent to said armature, a solenoid coil energizable to momentarily magnetize said armature and pole piece and to thereby cause the former to be rotated a definite distance by the latter, means for causing said pole piece to rotate a like distance in the same direction whenever said coil is deenergized, and pawl and ratchet mechanism for positively preventing reverse rotation of said armature and pole piece at all times.

10. A step-by-step rotary electric motor, comprising, a shaft rotatable in one direction only, an armature carried by said shaft, a pole piece rotatable relative to said shaft, means for magnetizing said armature and pole piece to intermittently rotate said shaft by successive equal steps, and means for rotating said pole piece by successive steps of similar magnitude whenever said armature and shaft are at rest.

11. A step-by-step rotary electric motor, comprising, a shaft rotatable in one direction only, an armature carried by said shaft, a pole piece rotatable relative to said shaft, means for magnetizing said armature and pole piece to intermittently rotate said shaft by successive equal steps, means for rotating said pole piece by successive steps of similar magnitude whenever said armature and shaft are at rest, and means for locking said armature and pole piece against movement during periods of rest thereof.

12. A step-by-step rotary electric motor, comprising, a shaft rotatable in one direction only, an armature carried by said shaft, a pole piece rotatable relative to said shaft, means for magnetizing said armature and pole piece to intermittently rotate said shaft by successive equal steps, means for rotating said pole piece by successive steps of similar magnitude whenever said armature and shaft are at rest, and means for positively preventing reverse rotation of said armature, shaft and pole piece at all times.

13. A step-by-step rotary electric motor, comprising, an intermittently rotatable shaft having an armature and a ratchet wheel secured thereto and rotatable therewith, a sleeve intermittently rotatable about said shaft and having a pole piece and another ratchet wheel secured thereto and rotatable therewith, a solenoid coil cooperating with said armature and pole piece to successively rotate the armature and its carrier shaft by successive equal steps, means for rotating said pole piece and sleeve in the same direction and by steps of similar magnitude whenever said coil is inactive, and pawls cooperable with said ratchet wheels to alternately lock the same against rotation.

14. A step-by-step rotary electric motor, comprising, an intermittently rotatable armature having a ratchet wheel secured thereto, an intermittently rotatable pole piece having another ratchet wheel secured thereto, means for rotating said armature in the same direction by successive equal steps, means for rotating said pole piece in a like direction by similar equal steps during periods of rest of said armature, and pawls coacting with said ratchet wheels to positively prevent rotation of said armature and pole piece whenever the other of said elements is rotating.

15. A step-by-step rotary electric motor, comprising, an intermittently rotatable armature having a ratchet wheel secured thereto, an intermittently rotatable pole piece having another ratchet wheel secured thereto, means for rotating said armature in the same direction by successive equal steps, means for rotating said pole piece in a like direction by similar equal steps during periods of rest of said armature, and pawls coacting with said ratchet wheels to positively prevent reverse rotation of said armature and pole piece at all times.

16. A step-by-step rotary electric motor, comprising, an armature having a ratchet wheel secured thereto, a pole piece cooperable with said armature and having another ratchet wheel secured thereto, a solenoid for successively magnetizing said armature and pole piece to intermittently rotate said armature by equal steps in the same direction, spring means for intermittently rotating said pole piece by like steps and in the same direction whenever said armature is at rest, and pawls coacting with said ratchet wheels to lock the complementary wheels of said armature and pole piece against rotation whenever said elements are at rest.

MARK M. HENNESSY.
HAROLD J. LAWRENCE.

REFERENCES CITED

The following references are of record in the file of this patent:

UNITED STATES PATENTS

| Number | Name | Date |
|---|---|---|
| 1,605,571 | Sperry | Nov. 2, 1926 |